(12) United States Patent
Karl

(10) Patent No.: US 12,401,704 B2
(45) Date of Patent: Aug. 26, 2025

(54) PROCESSING VIDEO DATA

(71) Applicant: Siemens Healthineers AG, Forchheim (DE)

(72) Inventor: Harald Karl, Fuerth (DE)

(73) Assignee: Siemens Healthineers AG, Forchheim (DE)

( * ) Notice: Subject to any disclaimer, the term of this patent is extended or adjusted under 35 U.S.C. 154(b) by 202 days.

(21) Appl. No.: 18/051,192

(22) Filed: Oct. 31, 2022

(65) Prior Publication Data

US 2023/0140506 A1 May 4, 2023

(30) Foreign Application Priority Data

Nov. 2, 2021 (EP) .................................... 21206029
Mar. 11, 2022 (EP) .................................... 22161704

(51) Int. Cl.
| | |
|---|---|
| *H04L 65/611* | (2022.01) |
| *H04L 49/351* | (2022.01) |
| *H04L 65/65* | (2022.01) |
| *H04N 21/44* | (2011.01) |

(52) U.S. Cl.
CPC .......... *H04L 65/611* (2022.05); *H04L 49/351* (2013.01); *H04L 65/65* (2022.05); *H04N 21/44004* (2013.01)

(58) Field of Classification Search
None
See application file for complete search history.

(56) References Cited

U.S. PATENT DOCUMENTS

| | | |
|---|---|---|
| 11,120,677 B2 | 9/2021 | Lasko |
| 2005/0195206 A1 | 9/2005 | Wogsberg |
| 2010/0296571 A1* | 11/2010 | El-Saban ......... H04N 21/21805 375/E7.026 |
| 2012/0251085 A1 | 10/2012 | Cheng et al. |
| 2013/0147900 A1 | 6/2013 | Weiser et al. |
| 2014/0267395 A1* | 9/2014 | Ross ..................... H04N 5/222 345/633 |
| 2022/0329883 A1 | 10/2022 | Stokking |

FOREIGN PATENT DOCUMENTS

| | | |
|---|---|---|
| CN | 102740124 A | 10/2012 |
| CN | 106375772 A | 2/2017 |
| EP | 0205712 A2 | 12/1986 |
| EP | 1513349 A3 | 8/2005 |
| JP | 2008172335 A | 7/2008 |
| WO | WO 2021043706 A1 | 3/2021 |

\* cited by examiner

*Primary Examiner* — Heather R Jones
(74) *Attorney, Agent, or Firm* — Harness, Dickey & Pierce, P.L.C.

(57) ABSTRACT

The invention relates to an integrated circuit arrangement, in particular an FPGA or an ASIC, for processing video data. It has a number of video interfaces for receiving and/or emitting video data from a plurality of data streams, as well as a frame buffer control system and a frame buffer interface. The invention further relates to a network device, a network, a computer unit and a method for processing video data.

20 Claims, 4 Drawing Sheets

PROCESSING VIDEO DATA

CROSS-REFERENCE TO RELATED APPLICATION(S)

The present application claims priority under 35 U.S.C. § 119 to European Patent Application No. 21206029.7, filed Nov. 2, 2021 and European Patent Application No. 22161704.6, filed Mar. 11, 2022, the entire contents of each of which are incorporated herein by reference.

FIELD

One or more example embodiments relates to an integrated circuit arrangement, a network device and a network, as well as a computer unit and a method for processing video data.

STATE OF THE ART

In video technology, for the transferring of video signals, at least the following steps are typically performed. Firstly, the video signals from a source, for example, a camera or another recording device, are read in or are generated via software. Subsequently, the video signals are output in a further step to a sink, for example, a monitor, a display or a data store. Often in practice, however, not only point-to-point connections are desirable, wherein a source is connected to a sink, but rather in many applications, it is also required that video signals are distributed from one or more sources to a plurality of sinks. Between the reading-in and the output of the video signals, in practice they are also further processed, for example, amplified, attenuated, chopped, converted into another frame rate or suchlike. In particular, video signals from different sources are also brought together and/or combined.

In practice, software is normally utilized in order to generate a combined video signal from different video signals. For this purpose, the video signals are initially digitized, for example, with the aid of so-called frame grabbers. The combination via software has the advantage that image components such as, for example, operating interfaces which vary between individual frames and/or images in their position and/or arrangement can be flexibly adapted during the combination of the respective video signals. For this purpose, the respective device must have—depending upon the usage, possibly expensive—hardware on which the software is executed. Furthermore, during such processing via software, in particular with broad-band video signals, the latency is unfavorably significantly increased.

SUMMARY

The combination of video signals also via integrated circuits is in principle known. Conventionally, for this purpose it has to be known in advance, via a configuration of the circuit, where the individual video signals are arranged. Therein, the latency is advantageously low. A combination of image components which vary between individual frames and/or images in their position and/or arrangement on the basis of integrated circuits is, however, not previously known.

One or more example embodiments of the present invention enable the combination of video signals with image constituents which vary between individual frames and/or images with a lower latency.

According to one or more example embodiments, an integrated circuit arrangement includes a number of video interfaces configured to at least one of receive or emit video data from a plurality of data streams; and a frame buffer control system and a frame buffer interface, the frame buffer control system configured to control access events to a frame buffer with a plurality of layers via the frame buffer interface in such that video data from the plurality of data streams is written into different layers of the frame buffer, the video data of a first layer has a defined color value in first image regions that are variable frame by frame, the first image regions are established using the defined color value, and a combined frame of video data is read out from the frame buffer, wherein in the first image regions, the combined frame is formed from the video data of a second layer, and in second regions, the combined frame is formed using the video data of the first layer.

According to one or more example embodiments, the video data of the first layer comprises software-generated data in second image regions.

According to one or more example embodiments, the defined color value is a color value complementary to user interface data.

According to one or more example embodiments, the first image regions have a plurality of sequential image points of the defined color value.

According to one or more example embodiments, the frame buffer has more than two layers and a higher-order layer of first image regions with a defined color value in which the combined frame is formed from the video data of a lower-order layer.

According to one or more example embodiments, the video interfaces comprise network interfaces configured to receive video data from separate network devices.

According to one or more example embodiments, the combination of the video data of lower-order layers takes place in the second image regions as a linear combination.

According to one or more example embodiments, the integrated circuit arrangement further includes a window control unit configured to reset positions of the data streams in the frame buffer based on a displacement of the position of one of the data streams in the frame buffer.

According to one or more example embodiments, a network device includes an integrated circuit arrangement; and physical interfaces connected to corresponding interfaces of the integrated circuit arrangement and to the frame buffer with a plurality of layers which is connected to the frame buffer interface and is controlled via the frame buffer control system.

According to one or more example embodiments, a computer unit is configured to generate a first layer of video data for transferring to an integrated circuit arrangement, wherein the video data of the first layer comprises, in first image regions that are variable frame by frame, a defined color value and, in second image regions, software-generated data.

According to one or more example embodiments, the software-generated data is user interface (UI) data, the UI data comprises video data of a mouse pointer.

According to one or more example embodiments, a network comprises at least one network device, the at least one network device being a network device according to one or more example embodiments.

According to one or more example embodiments, a method for processing video data via an integrated circuit includes receiving video data from a plurality of data streams; writing video data from the plurality of data streams into different layers of a frame buffer, the video data of a first layer has a defined color value in first image regions that are variable frame by frame; establishing the first image regions using the defined color value; and reading out a combined frame of video data from the frame buffer, wherein in the first image regions, the combined frame is formed from the video data of a second layer, and in the remaining regions, the combined frame is formed using the video data of the first layer.

According to one or more example embodiments, a non-transitory computer program product has a computer program which can be directly loaded into an integrated circuit arrangement, having program portions that cause the integrated circuit arrangement to perform a method according to one or more example embodiments when the integrated circuit arrangement is configured via the computer program.

According to one or more example embodiments, a non-transitory computer-readable medium has program portions that, when executed by an integrated circuit arrangement, cause the integrated circuit arrangement to perform a method according to one or more example embodiments.

BRIEF DESCRIPTION OF THE DRAWINGS

The invention will now be described again in greater detail using exemplary embodiments, making reference to the accompanying figures. In the various figures, the same components are provided with identical reference numbers.

The figures are in general not to scale. In the figures.

DETAILED DESCRIPTION

Figure 1:
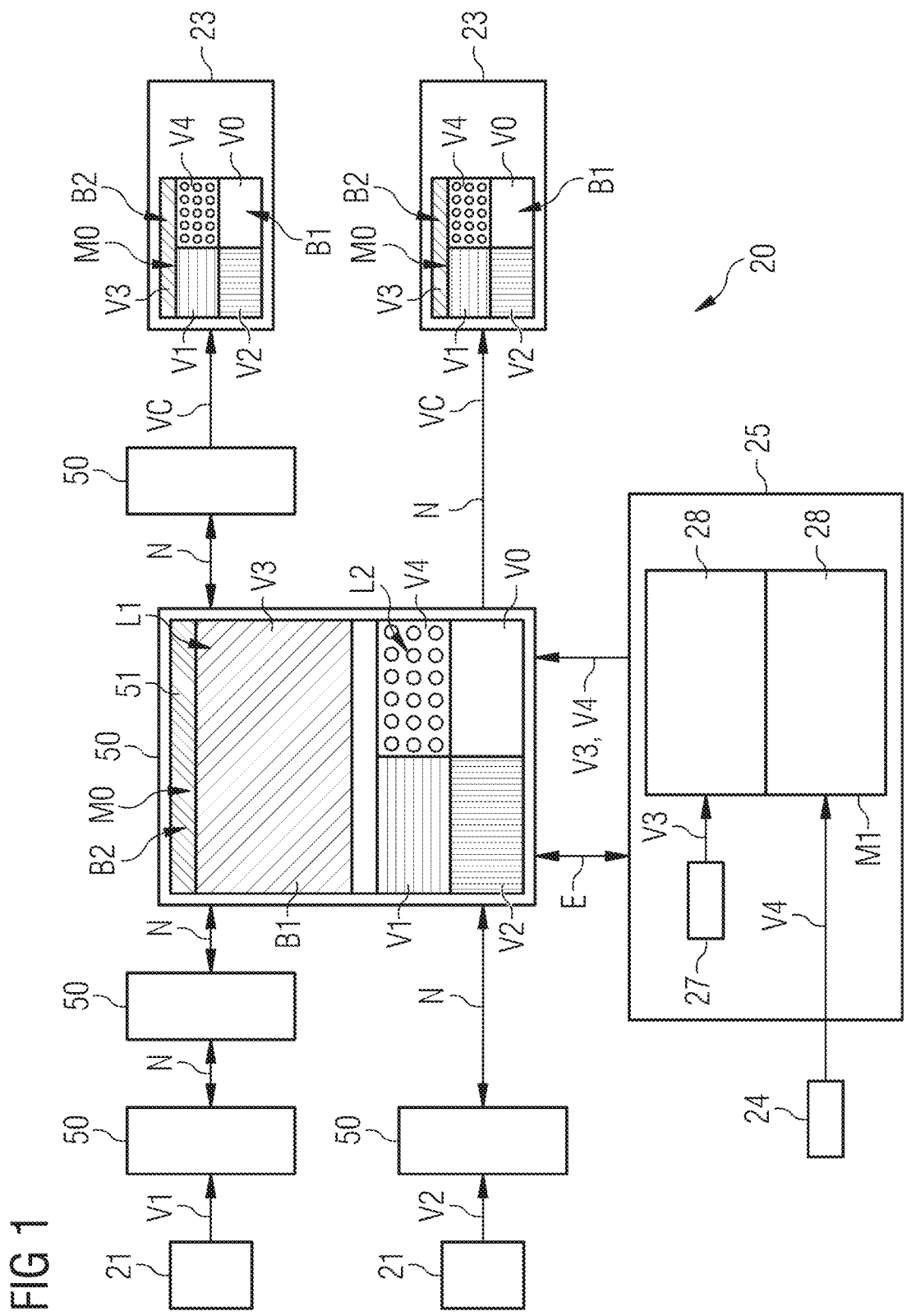
FIG. 1 shows a schematic block diagram of an exemplary embodiment of a network according to the invention.

The integrated circuit arrangement mentioned in the introduction is configured, in particular, as an integrated circuit, for example, in the form of an FPGA or an ASIC and serves for processing video data. The integrated circuit arrangement is therein configured, in particular, so that the video data—if desired—can be received and/or emitted in an uncompressed manner. For this purpose, it has a number of video interfaces for receiving and/or emitting the video data from a plurality of data streams.

Furthermore, the integrated circuit arrangement comprises a frame buffer control system and a frame buffer interface. Therein, the frame buffer control system controls access to a frame buffer with a plurality of layers via the frame buffer interface so that the video data from a plurality of data streams is written into different layers of the frame buffer. Therein, the video data of a first layer has a defined color value in first image regions which are variable frame-by-frame.

A combined frame of video data is read out of the frame buffer. For this purpose, the first image regions are determined using the defined color value. In the first image regions, the combined frame is formed from the video data of a second layer. As contrasted therewith, the combined frame is formed in the remaining regions using the video data of the first layer.

An embodiment of the integrated circuit arrangement as an FPGA is particularly flexible, since the FPGA can still be configured according to the application. An embodiment of the integrated circuit arrangement as an ASIC is to be produced economically, particularly in large numbers.

The video interfaces can, in principle, be any desired video interfaces, for example, digital interfaces such as, for example DP, DVI, HDMI, SDI or suchlike or analogue interfaces such as, for example, VGA, XGA, S-video or suchlike. They are preferably configured to receive and/or to emit the video signal in an uncompressed manner. The number of video interfaces can be configured as required.

The video interfaces can also be configured, for example, as network interfaces. I.e. the integrated circuit arrangement comprises, for example, a number of network interfaces for connecting the integrated circuit arrangement with a number of substantially identical, spatially separate, integrated circuit arrangements for transferring data which comprises at least video data.

Via the network interfaces, the integrated circuit arrangement and/or the network device by which it is included, is preferably connected to further integrated circuits, in particular circuits according to one or more example embodiments of the present invention. The fact that these circuit arrangements are "substantially identical" means that they possibly overlap in the number and/or embodiment of their video interfaces, network interfaces and/or video processing units, but are otherwise configured identically.

Preferably, the integrated circuit arrangement has both a number of video interfaces for receiving and also a number of video interfaces for emitting video signals. The expression "number" generally means, in the context of this invention "one or more".

The video data is typically present in the form of data streams (also video streams) in which an image sequence of the video data is serially transferred image-wise, that is framewise and in a frame, preferably line-wise, and in the lines, particularly preferably pixel-wise, i.e. image point-wise.

A frame is a single image which is placed—in particular at the frame rate underlying the transfer—in the frame buffer and is read out therefrom. A sequence of the individual combined frames therefore forms a combined video signal and/or a combined video data stream.

Via the frame buffer interface, the video data of the individual incoming data streams is written into the frame buffer. For this purpose, the data streams are each assigned via the frame buffer control system to different regions in the frame buffer.

For this purpose, the frame buffer is subdivided into a plurality of, i.e. at least two, layers and/or slices. Therein, a layer denotes a region of the frame buffer which preferably comprises video data of a complete frame of the resolution that is to be read out. Within a layer, on the basis of the position at which the video data of a data stream is written into the frame buffer, for example, its position in the frame that is to be read out can also be determined.

A combined frame of video data which comprises video data from different layers is also read out from the frame buffer. For this purpose, the layers are arranged in a display hierarchy and/or order of priority. This means, for example, that the first and/or uppermost layer in the combination has priority relative to the further and/or lower layers. Only in regions which are denoted in the upper and/or highest-order layers by defined color values, i.e. the pixels of which are filled with these defined color values, is the video data from the lower-order layers accepted during the combination. The combination of the video data of the individual layers therefore preferably takes place exclusively on the basis of the defined color values and the display hierarchy of the layers.

In particular, the video data of the first layer has image regions that are variable frame by frame. I.e. for example that a number, an arrangement and/or a size of the first image regions of the first layer that are not adopted during the combination into the combined frame change from frame to frame. Accordingly, in addition thereto, a number, an arrangement and/or a size of the second and/or the remaining image regions of the first layer that are adopted during the combination into the combined frame can change from frame to frame.

The framewise variability of the image regions of the first layer is therein preferably not brought about via a change in the configuration of the frame buffer control system, but only by way of the identification of the first image regions with a defined color value.

Whereas in the second image regions, the video data of the first layer is therefore output in the combined frame, the first image regions are masked with the defined color value in order to be overwritten with video data of the lower-order layers, for example, the second layer.

The defined color value denotes a color value which is selected according to the color space and/or color model used. This can therefore be, for example, a specified gray value, an RGB value, a Y'CbCr value or suchlike.

In other words, the frame buffer control system and the frame buffer interface enable different incoming video signals and/or video data streams to be combined according to their display hierarchy determined by the layer in the frame buffer and on the basis of the image regions denoted by the defined color values to a common and/or combined video signal.

The integrated circuit arrangement according to one or more example embodiments of the present invention therefore enables the individual video signals to be combined outside of, and independently of, a computing unit, for example in the form of a PC, to form a combined frame. Via the defined color value, the combination to the combined frame preferably takes place without the use of software, but rather solely via hardware components.

The network device mentioned in the introduction has a circuit arrangement according to one or more example embodiments of the present invention and physical interfaces which are connected to the corresponding interfaces of the integrated circuit arrangement. In addition, the network device comprises a multilayer frame buffer which is connected to the frame buffer interface of the integrated circuit arrangement.

Depending upon the type of the further interfaces, the network device can thus be connected to video sources, video sinks, further network devices and preferably, using additional suitable interfaces, to devices such as computer units, USB devices and/or PCs or suchlike.

The video sources can, in principle, be any apparatuses that output video signals. For example, they can comprise cameras, medical imaging modalities, for example, X-ray devices, computed tomography devices, magnetic resonance tomographs, ultrasonic devices or suchlike, video signals generated by software and/or measuring devices, for example ECGs, EEGs or suchlike, video signals that are called up from data stores or suchlike. In particular, the video data of the first layer is preferably generated via software, as described below in greater detail.

The video sinks can, in principle, be any apparatuses that output video signals. They can comprise, for example, monitors, displays or other display apparatuses, data stores, a connection to an external network or suchlike.

The computer unit mentioned in the introduction is configured for generating a first layer of video data for transfer to an integrated circuit arrangement according to one or more example embodiments of the present invention. Therein, the video data of the first layer has a defined color value in first image regions which are variable frame-by-frame. In second regions, the video data of the first layer comprise software-generated data, in particular UI data.

With the aid of software, the computer unit thus generates the video data for the first layer of the frame buffer. In the second image regions which are preferably different from the first image regions, this video data comprises in particular UI (user interface) data, that is, video data of an operating interface and/or a user interface.

Depending upon the interaction by a user or by software-generated events, the second image regions, the second image regions that are filled with the UI data possibly change. An enlargement and/or diminution and/or change of the arrangement of the first image regions and/or the second image regions takes place, for example, by way of an opening or closing of pop-up menus, drop-down menus or suchlike. Since these changes in the operating interface usually comprise important information, they are preferably placed into the second image regions of the first layer of the frame buffer, that is, with the highest priority and are subsequently read out or displayed in the combined frame.

However, precisely the video data of user interfaces and also the second image regions occupied thereby is variable such that they can change from frame to frame. In addition, the user interface can assume complex forms, for example, in a plurality of fold-out submenus. Under these requirements, in particular, the second image regions occupied with UI data are not realized via a configuration of the frame buffer control system. Rather, according to one or more example embodiments of the present invention, via the masking of the first image regions they are kept free with a defined color value in that only in the first image regions, other video data from lower-order layers of the frame buffer is displayed. The first image regions therefore comprise, in particular, image regions in which no UI data is displayed.

Using the aforementioned components, the network mentioned in the introduction is formed in which, inter alia, high-resolution video signals are preferably transferred. It comprises a number of network devices according to one or more example embodiments of the present invention which are connected to one another in a preferably known network topology. Where required, it additionally comprises further components, as described above. With the aid of a suitable routing, video data from different data streams can be transferred from the respective video sources to a circuit arrangement according to one or more example embodiments of the present invention. In addition, a combined frame generated in a circuit arrangement according to one or more example embodiments of the present invention and/or a video stream of such combined frames can be transferred via the network to the desired video sinks and output there.

The method mentioned in the introduction for processing video data comprises the following steps which are carried out via an integrated circuit arrangement, in particular an FPGA or an ASIC. In a first step, video data is received from a plurality of data streams. The video data from a plurality of data streams is written in a further step into different layers of the frame buffer. Therein, the video data of a first layer has a defined color value in first image regions which are variable frame-by-frame.

Furthermore, a combined frame of video data is read out of the frame buffer. For this purpose, the first image regions are determined using the defined color value. In the first image regions, the combined frame is formed from the video data of a second layer and in the other regions, the combined frame is formed using the video data of the first layer.

A majority of the aforementioned components of the network device can be realized entirely or partially in the form of integrated circuits and/or logic arrangements.

Fundamentally however, these components can also, in part, be realized in particular if particularly rapid calculations are involved, in the form of software-supported hardware, for example, FPGAs, ASICs or suchlike. Similarly, the required interfaces can be configured, for example, where only an acceptance of data from other software components is concerned, as software interfaces. However, they can also be configured as interfaces which are constructed as hardware and are controlled by suitable software.

A realization largely through software has the advantage that network devices which are already conventionally used can also easily be upgraded by way of partial re-equipping and a software update and/or reconfiguration of the integrated circuit arrangement (FPGAs) in order to operate in the manner according to one or more example embodiments of the present invention. In this respect, the object is also achieved by way of a corresponding computer program product which is loadable directly into a programmable logic arrangement of a network device, having program portions and/or logical instructions in order to carry out steps of the method according to one or more example embodiments of the present invention when the logic is executed in the network device. Such a computer program product can comprise, apart from the computer program, additional constituents, if relevant, such as for example, documentation and/or additional components including hardware components, for example, hardware keys (dongles, etc.) in order to use the software.

For transport to the network device and/or for storage in the network device, a computer-readable medium, for example, a memory stick, a hard disk or another transportable or firmly installed data carrier can be used on which the program portions of the computer program which are configured to be programmed and executed on the integrated circuit arrangement are stored. For this purpose, the integrated circuit arrangement can have, for example, one or more cooperating logic elements or suchlike.

Further particularly advantageous embodiments and developments of the invention are disclosed by the dependent claims and the following description, wherein the claims of one claim category can also be further developed similarly to the claims and description passages relating to another claim category and, in particular also, individual features of different exemplary embodiments and/or variants can be combined to new exemplary embodiments and/or variants.

In second regions, the video data of the first layer preferably comprises in second image regions software-generated data, in particular UI data, as already described above in relation to the computer unit.

It is possible in principle, for each pixel individually, to check whether the color value of the pixel corresponds to the defined color value. However, with such a pixelwise color value, artifacts can arise if by chance one or a few pixels, for example in images or graphics which are actually arranged in the second image regions have the defined color value.

Therefore, the first image regions preferably have, line by line, a plurality, i.e. at least 2, particularly preferably at least 4, more particularly preferably at least 6 and most particularly preferably at least 8 sequential image points of the defined color value. Therein, the video data of the second layer are thus only adopted into the combined frame if a corresponding plurality of pixels of a line have the defined color value. Thereby, the possibility that the video data of the lower-order layers is adopted in an undesirable manner at image points which actually belong to the second image regions can be reduced or prevented.

Preferably, the UI data and/or the operating interface of a software have a color scheme that is known and/or specifiable, in particular, during the programming. It is therefore known which color values occur often and which seldom or not at all.

The frame buffer preferably comprises more than two layers. Therein, a higher-order layer has first image regions with a defined color value in which the combined frame is formed from the video data of a lower-order layer. I.e., the highest-order layer, that is the first and/or uppermost layer, is adopted with the highest priority into the combined frame and only in the image regions masked by the defined color value is video data of the second layer adopted. The video data of the second layer is adopted with the next priority and only in the image regions masked by the defined color value both in the first layer and also in the second layer is video data of the third layer adopted, and so on.

Preferably, the video interfaces comprise network interfaces which receive video data from separate network devices. Herein, "separate" means spatially distanced. The devices are connected to one another via the network interfaces, i.e. via a network suitable for video transfer.

The combination of the video data of the lower-order layers—that is, the layers apart from the first layer—preferably takes place in the first image regions as a linear combination. This can take place, for example, via the following formula:

$$VC(x)=\alpha*L3(x)+(1-\alpha)*L2(x)$$

Therein, $VC(x)$ denotes a color value at the image point $x$ in the combined frame. This is composed of a linear combination of the color value (and/or the three RGB values) at the image point $x$ of the second layer $L2(x)$ with the color value at the image point $x$ of the third layer $L3(x)$. Therein, $\alpha$ is a value between 0 and 1 and weights the color value of the third layer $L3$ in relation to the color value of the second layer $L2$. In other words, an alpha blending and/or a partially transparent overlap between the two layers is carried out.

It is thus achieved via the alpha blending in the first image regions that the corresponding video data obtains a partially transparent and/or translucent optical effect.

The frame buffer interface and the frame buffer are preferably configured so that write access and read access events can take place simultaneously at least in different regions of the frame buffer. Thereby, the access events to the frame buffer can be controlled in a time-efficient manner.

Provided the frame buffer comprises more than two layers, all the layers can use exactly one common color value as the defined color value for masking the first image regions.

Alternatively, each layer preferably has a single defined color value. By this means, advantageously, for each layer a defined color value can be determined which is as complementary as possible to the video data of the second image regions which are placed in the respective layer. The establishment of a corresponding color value has already been described in detail above.

In the lowest layer and/or the layer with the lowest priority, image regions in which no video data is placed can be filled with a background color or a background graphic. Via this default color and/or default graphic, an optically more attractive appearance can be achieved in the combined frame.

The computer unit preferably generates the UI data so that it comprises video data of a mouse pointer. This means that, via a computing unit, the position of the mouse pointer which is captured as the result of a user input via a mouse is established. The mouse pointer is written into the frame buffer as in the video data of the first layer and is correspondingly not masked with the defined color value, so that it is output in the combined frame. For the mouse pointer, different symbols can be provided via the software, dependent upon the context of the display and/or the position of the mouse pointer.

Preferably, the video data comprises at least high-resolution video data and/or video signals (according to the HD video standard). Video data should be understood within the meaning of one or more example embodiments of the present invention to have the at least HDTV-typical image resolution of 1280×720 pixels at an image refresh rate or frame rate of 50 fps. Preferably, however, the resolution is 1920×1080 pixels. Naturally, lower resolution video signals can also still be processed and transferred via the integrated circuit arrangement.

Particularly preferably, the video data comprises ultra-high-resolution video data (in accordance with the UHD video standard). "Ultra-high-resolution video data" should be understood to mean video data with a resolution of 4K or more. "4K" means that the resolution lies in the order of 4000 pixels per line, that is for example, 3840, 4096 or suchlike. Particularly preferably, the video data also comprises video data with a resolution of 8K (ca. 8000 pixels per line). This is particularly advantageous in order to achieve a realistically detailed representation, even on relatively large display means.

Preferably, a position in the frame buffer is assigned in each case via the frame buffer control system to a data stream of video data, so that the arrangement of the video data of the respective data streams in a frame is defined. The frame buffer control system is therein configured—particularly preferably as specified by a user—so that via the respective position at which the frames of the individual original video signals are each placed in the frame buffer, it also controls the position in the resulting combined frame. The individual video signals can thus advantageously be combined as needed.

In addition or alternatively, the integrated circuit arrangement preferably has a window control unit which, on a displacement of the position of a data stream of video data in the frame buffer, resets the positions that become free. The displacement of the position of the data stream therein takes place by way of a change in the configuration of the frame buffer control system.

Via the window control unit, it is therefore advantageously ensured that only current information is contained in the combined video signal. This can take place, for example, in that the corresponding positions are set to a background value and/or in that an alpha value of the previously placed video signal is set to zero.

Preferably, the network device comprises a processor which is connected to the integrated circuit arrangement. Among other things, it configures the routing of the video data of the individual data streams and/or parameters as needed for the image processing via a UDP unit included by the integrated circuit arrangement.

The processor processes, for example, user input and sends corresponding UDP data to the UDP unit. The UDP unit translates the UDP data into a suitable format for write access events for the configuration of other components of the network device.

Corresponding instructions for reconfiguration of the routing of the video data or the parameters for the image processing can be transferred as UDP data via the network to other network devices and/or to the respective target network device.

Shown in FIG. 1, by way of example, is a network 20 according to an exemplary embodiment of the invention as a block diagram. In this exemplary embodiment, the network 20 comprises five network devices 50 which are constructed substantially identically. It is, however, possible without difficulty to adapt the number and the arrangement of the network devices 50 as needed and/or according to the application. One of the network devices is connected to a computer unit 25 and/or a computer 25. This is also denoted below as a proxy network device 50. Via the computer unit 25, among other instructions, for the configuration of the network 20, Ethernet data E can be sent via an Ethernet connection to the network device 50.

Two of the network devices 50 are connected to video signal sources 21. The video signal sources 21 can be configured, for example, as cameras, but this can also involve, for example, video data—also designated video signals below—which are generated by software, and they can originate from medical imaging modalities such as, for example, X-ray devices or can be output by measuring devices such as an ECG or an EEG as video data.

The video signal sources 21 transfer their video signals V1, V2 to the network devices 50 connected thereto. The network device 50 to which the video data V2 is sent is directly connected to the proxy network device 50. The network device 50 to which the video data V1 is sent is indirectly connected via a further network device 50 to the proxy network device 50.

The network devices 50 transmit network data N between one another. The network data N consists of special data packets which comprise, as useful data, among other things, the video data V1, V2, V3, V4, Ethernet data E, USB data or suchlike. Apart from the network data N comprising the useful data, there is transmission control data which comprises address data, checksums or suchlike.

The computer unit 25 is connected to a medical imaging modality 24 in the form of an X-ray device 24. The X-ray device 24 records video data V4, for example, from the interior of a patient and transmits it to a frame buffer 28. In addition, video data V3 generated by a software package and in this exemplary embodiment comprising elements of the operating interface, i.e. UI data, is additionally written into the frame buffer 28. The UI data is arranged in second image regions B2 and is to be output and/or displayed with the highest priority. According to one or more example embodiments of the present invention, the computer unit 25 therefore generates the video data V3 so that the video data V3 has a defined color value only in the first image regions B1. The defined color value denotes the first image regions so that during the composition of a combined frame VC with other video data V1, V2, V4, V0, they are overwritten.

The video data from both the video data streams V3, V4 is thereby placed into two different frames. The frame buffer 28 is therefore written at a frame rate that is present in the respective video signal and, if relevant, is read out at another frame rate, wherein an arbitration logic system can prevent any conflicts between read and write access events.

The video signals V3, V4 are transmitted to the proxy network device 50. In the proxy network device 50, the video signal V3 is written into a first layer L1 of a frame buffer 51, whereas the video signal V4 is written together with the video signals V1 and V2 from the other video signal sources 21 into a second layer L2. The information relating to the assignment of the video signals V1, V2, V3, V4 to the individual intended layers L1, L2 and to the intended position within the respective layer is placed in a configuration of the frame buffer control system 87 (see FIG. 3).

The video data V3 of the first layer L1 has a second image region B2 which extends as a bar over the entire width in the upper region of the first layer L1. This can, for example, entail a menu bar. In addition, for example, a mouse pointer can be included by the video data V3 of the first layer L1 and/or the UI data. The remaining regions of the first layer L1 are denoted with the defined color value as first image regions B1. In the second layer L2, the upper region (corresponding to the second image region B2 of the first layer L1) is kept free, whereas the video signals V1, V2, V4 thereunder are arranged as substantially identically dimensioned rectangles. The expressions "above", "below", etc. relate herein to an intended display of the video signals. No incoming video signal is arranged in the region V0. Therefore, a default color value or a graphic is inserted as the background and is possibly used in the creation of the combined frame VC.

The video signals V1, V2, V3, V4, V0 are, in principle, scalable as desired, for example, via the video processing units 90, 91, 92 (see FIG. 3), described in more detail below, and can be arranged as desired via the frame buffer control system 87 in the respective layer L1, L2 of the frame buffer 51 and thus also in the combined frame VC generated therefrom.

The combined frame VC and/or the combined video signal VC is packed into network data N for transmission and is transferred to network devices 50. The combined video signal VC is output via the video signal sinks 23 and/or output means 23 connected to the network devices 50, for example, in the form of monitors, displays or suchlike. Alternatively or additionally, the combined video signal VC can also be output via an output means 23 directly connected to the proxy network device 50.

Via the network 20 according to one or more example embodiments of the present invention, video signals V1, V2, V3, V4 from different video signal sources 21, 26, 27 can thus be processed and/or assembled as required, transferred along different routes through the network and output to video sinks 23 selected by a user. The function of the network devices 50 is explained below in detail, making reference to FIG. 2.

The network 20 is configured in accordance with its design according to requirements and therefore has a known topology. Thereby, the routes between the network devices 50, the components included by them and the components connected to them can be established and recorded in an addressing scheme. Via the addressing scheme, the route from one point of the network 20 to another point of the network 20 can thus be established and so the corresponding data streams can be passed on as needed.

Figure 2:
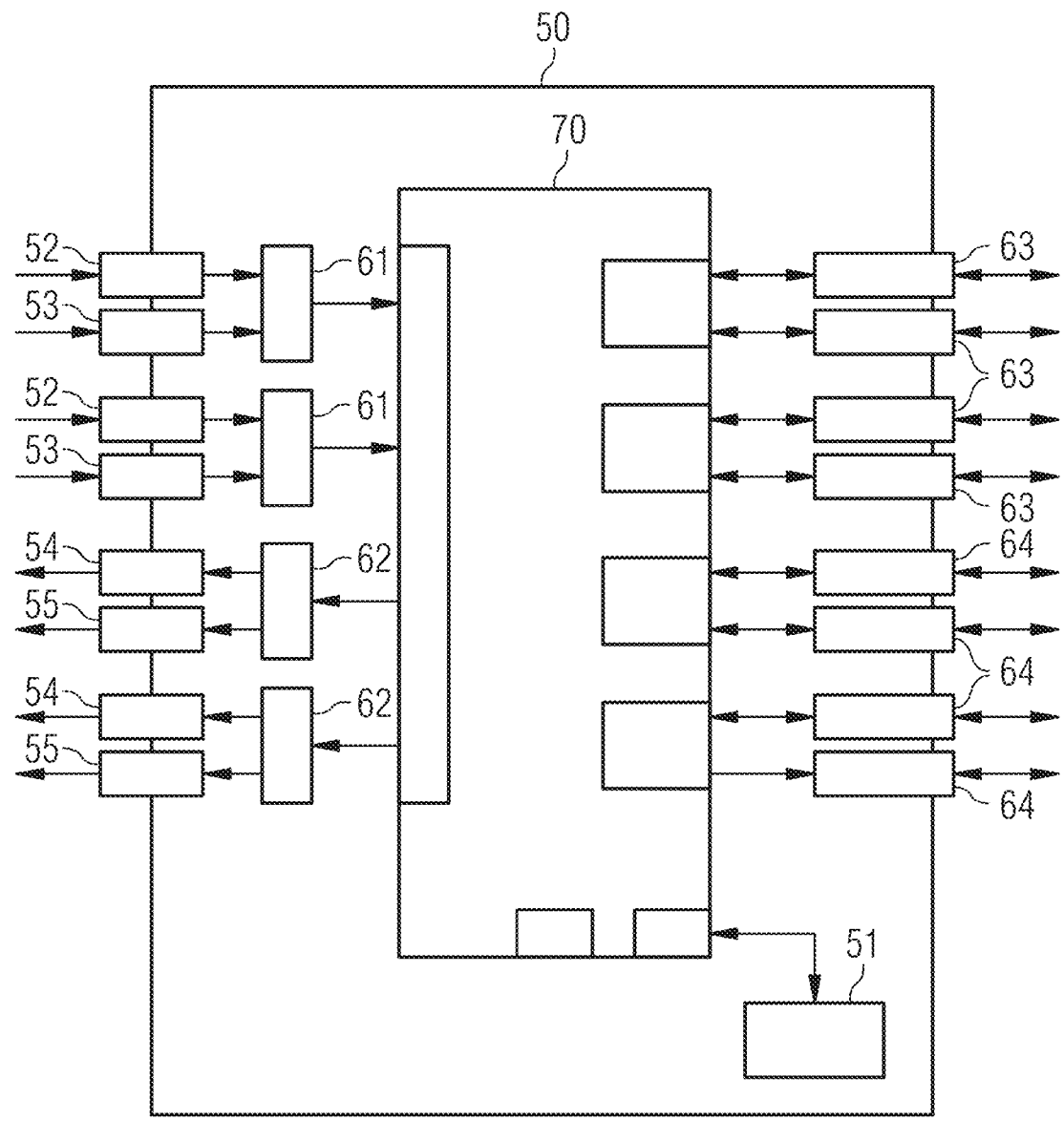
FIG. 2 shows a schematic block diagram of an exemplary embodiment of a network device according to the invention.

FIG. 2 shows schematically, by way of example, a network device 50 according to one or more example embodiments of the present invention as a block circuit diagram. The network device 50 comprises, as a central component, an integrated circuit arrangement 70, which is configured herein as an integrated circuit 70, in particular as an FPGA. The integrated circuit 70 will now be described in detail making reference to FIG. 3.

The network device 50 has physical plug connections 52, 53, 54, 55 for video signals. Two display port inputs 52 and two HDMI inputs 53 serve for receiving video signals. Therein, a display port input 52 and an HDMI input 53 are connected, in each case, to a common multiplexer 61, wherein only one of the two inputs 52, 53 is used at a time. Both the HDMI and also the display port have four signal pins and/or lanes each. The lanes of the plug connection 52 or 53 used are merged via the multiplexer 61 into one signal line and transferred to the integrated circuit 70.

Conversely, the integrated circuit 70 outputs a multiplexed video signal to a demultiplexer 62, which outputs the combined video signal according to the standard of the respectively connected output 54, 55 distributed onto different lanes. For emitting the video signals, two display port outputs 54 and HDMI outputs 55 are provided in each case, wherein a display port output 54 and an HDMI output 55 are connected, in each case, to a common demultiplexer 62, although only one of the outputs is used at a time.

The display port terminals therein support what is known as display port multistream (DP-MST), with which at least two video signals can be transferred via a display port terminal.

The embodiment of the video signal inputs 52, 53 and video signal outputs 54, 55 described takes into account that at the location of the installation of the network 20, one terminal type often predominates. The network devices 50 are also, in principle, to be used in one construction form at different locations which, where relevant, require different terminal types. Other video plug connections, for example, VGA, S-video or DVI can be adapted if required.

The network device 50 further has eight network connections 63, 64. Of these, four are configured as SFP modules 63 and can be equipped, as needed, with SFP transceivers in order to reduce the cost of the relatively costly transceiver. Depending upon the distance to be bridged, the SFP transceivers can be configured as single-mode transceivers or multi-mode transceivers and, if needed, can have transfer rates of, for example, 5 Gbit/s or 10 Gbit/s. The other four network terminals are configured, for example, as PCIe terminals 64, so that the network device 50 can, if required, also be introduced as a plug-in module into a suitable apparatus, for example, a computer unit or a medical imaging modality.

The number of video terminals 52, 53, 54, 55 and the network terminals 63, 64 of the network device 50 is substantially dependent upon the processing power of the integrated circuit 70 and can additionally be selected as desired, during the design of the network device 50.

The network device 50 also has a frame buffer 51, in the form of one or more DDR-RAM modules, which is configured as a multilayer frame buffer. The administration of the frame buffer 51 will now be described in detail making reference to FIG. 3.

Figure 3:
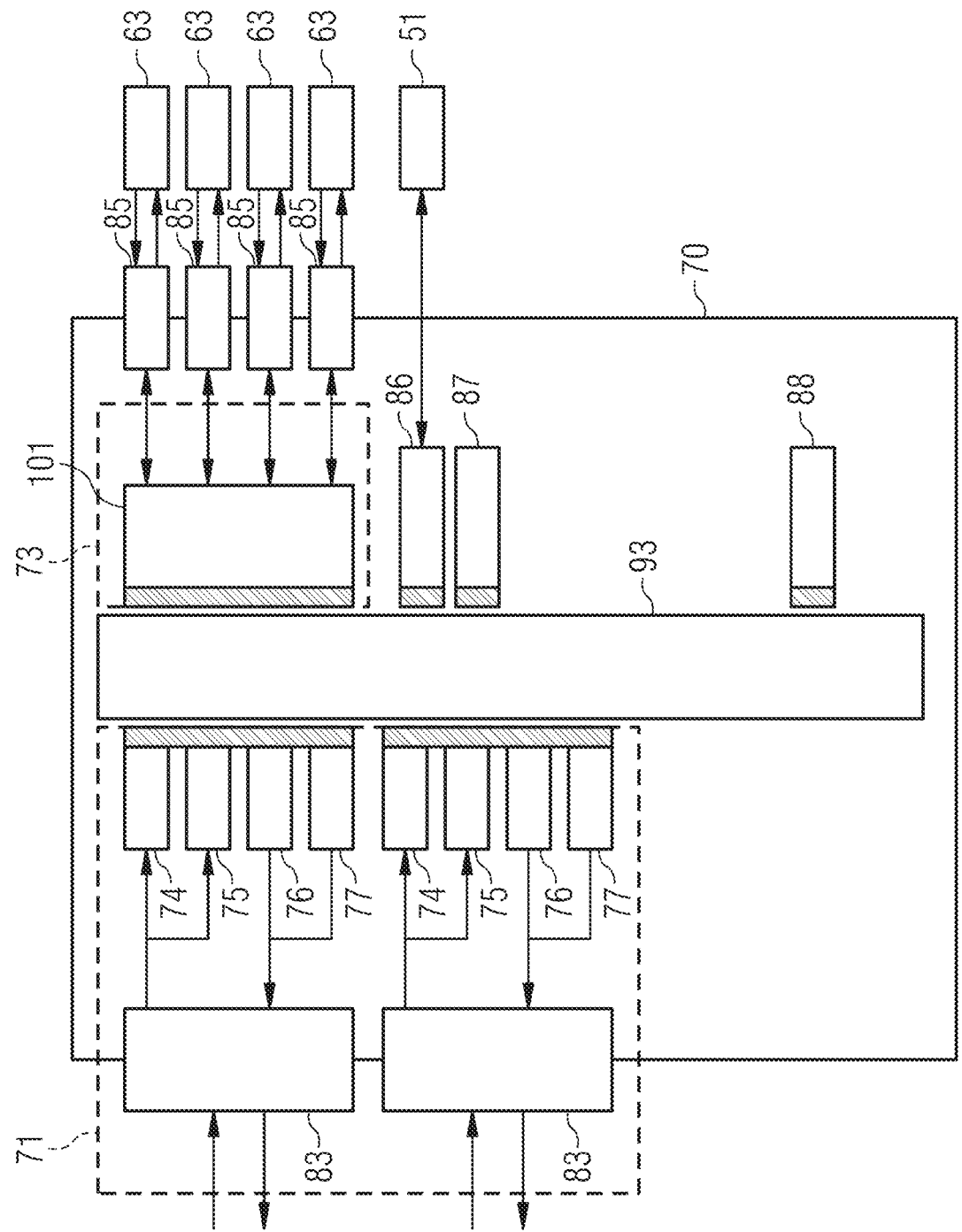
FIG. 3 shows a schematic block diagram of an exemplary embodiment of a circuit arrangement according to the invention.

FIG. 3 shows schematically, by way of example, an integrated circuit 70 according to the invention in the form of an FPGA, as a block diagram. The integrated circuit 70 has a video module 71 and a network module 73. The outputs and/or inputs of the individual network interfaces 85 are connected to the network terminals 63 of the network device 50 which are configured as SFP transceivers.

The video module 71 has two identically configured combined video input-output interfaces 83 which are each connected to a multiplexer 61 and a demultiplexer 62 of the network device 50. Via a combined video input-output interface 83, either an ingoing or an outgoing video signal can be passed on in the corresponding direction at the same time. An incoming video signal is passed on, depending upon the standard on which it is based, either to a display port connecting matrix input interface 74 or to an HDMI connecting matrix input interface 75. An outgoing video signal is received according to the standard on which it is based and at a display port connection matrix output interface 76 defined according to the component address of the addressing scheme or at an HDMI connection matrix output interface 77 via the connection matrix 93 and is passed on via the combined video output interface 83 connected thereto to the corresponding demultiplexer 62 of the network device 50.

The integrated circuit 70 further has a frame buffer control system 87 and a frame buffer interface 86. Therein, the frame buffer control system 87 controls access to the frame buffer 51 of the network device 50 via the frame buffer interface 86 so that video data V1, V2, V3, V4, V0 from a plurality of data streams is written into different layers L1, L2 of the frame buffer 51.

For this purpose, a position in the second layer L2 of the frame buffer 51 is assigned, in each case, via the frame buffer control system 87 to a data stream of video data V1, V2, V4, so that the arrangement of the video data of the respective data streams is defined also for the generation of the combined frame VC. The frame buffer control system 87 therein also controls—in particular once its configuration has been set up according to specifications of a user—that is, via the respective position at which the frames of the individual original video signals V1, V2, V4 are each placed in the frame buffer 51, the position in the resulting combined video frame VC.

For reading out and/or generating the combined frame VC, it is initially established in the first layer L1 at which positions and/or image points the defined color value occurs. In particular, it is established therein whether the defined color value occurs at a plurality, that is at least two, sequential image points in a row. In these image points, specifically the first image region B1, the video data V1, V2, V4, V0 of the second layer L2 is used for the generation of the combined frame VC. In the other image points, specifically the second image region B2, the video data V3 of the first layer L1 is used. The combined frame VC of video data V1, V2, V3, V4, V0 assembled in this way is read out from the frame buffer 51 via the frame buffer interface 86.

The combined frame VC therein comprises, in the upper second image region B2, video data V3 which has a menu bar M0 as UI data. Thereunder, in the combined frame VC in the first image region B1 in equal-sized rectangles, the video signals V1, V2, V4 are arranged, which comprise video data from external sources. The remaining rectangle below and to the right is filled during the reading out of the combined frame VC with a background color and/or background graphic selected by default, since no video data is present there in the second layer L2.

Figure 4:
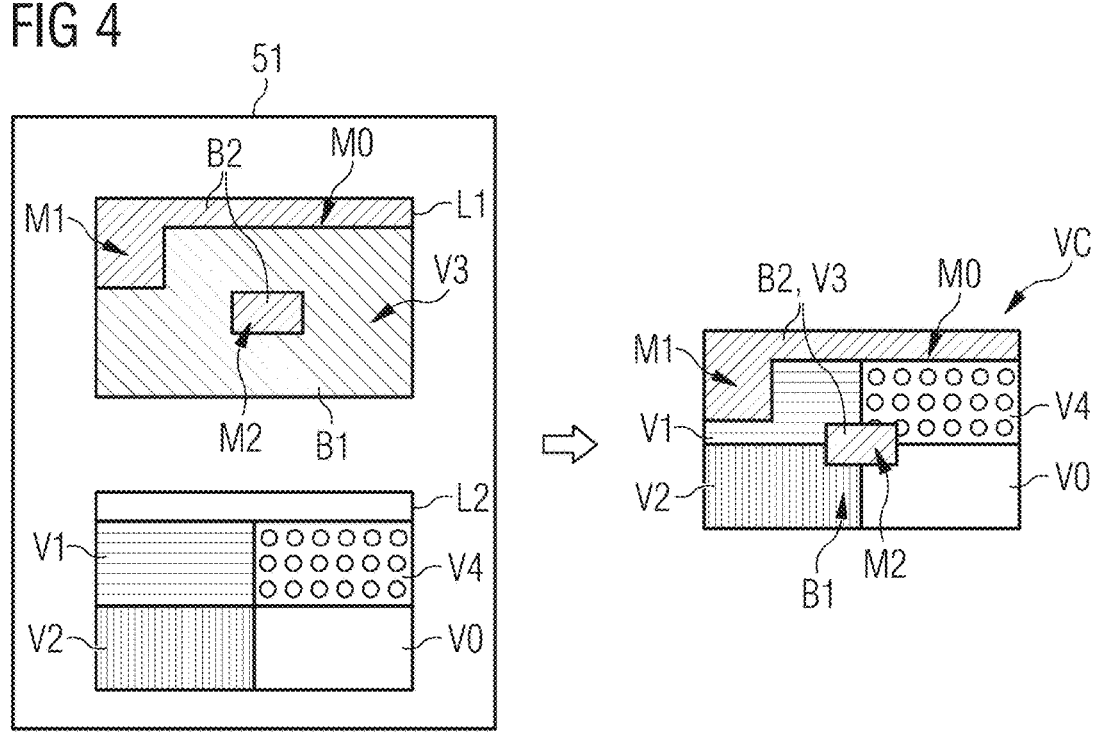
FIG. 4 shows a schematic block diagram example of a frame buffer with a plurality of layers and of a read-out combined frame.

Shown in FIG. 4, by way of example, is a frame buffer 51 of a network device 50 according to the invention in which another set of incoming video data V3' has been written into the first layer L1. Here, apart from the menu bar M0 (see FIG. 1), the video data V3' comprises a dropdown menu M1 which is arranged as a rectangle in the upper right corner below the menu bar M0. In addition, the video data V3' comprises a pop-up menu M2, which is arranged as a rectangle centrally and/or vertically and horizontally centered in the first layer L1.

The additional menus M1, M2 are included, for example, by the video data V3' if a user moves with an input device, for example, a mouse, a keyboard or suchlike, over triggering operating interfaces, or clicks thereon or suchlike. The menus can therein change frame by frame and can assume any complex forms, so that it would be unfavorable to realize their changes of shape and arrangement via the configuration of the frame buffer control system 87.

The menus M0, M1, M2 are recognized as UI data by the software 27 of the computer unit 25, assigned to the second image regions B2, and thus are not masked with the defined color value. However, according to one or more example embodiments of the present invention, the first image regions B1 are masked with the defined color value.

From the first layer L1 and the second layer L2, as already described above, the combined frame VC' is generated. As distinct from the combined frame VC in FIG. 1, however, the combined frame VC' additionally contains the further menus M1, M2. In the corresponding image regions, the video data V1, V2, V4, V0 which originates from the second layer L2 is thus not completely adopted into the combined frame VC'.

In addition, the integrated circuit arrangement 70 has a window control unit 88 which, on a displacement of the position of a data stream of video data V1, V2, V4, V0 in the frame buffer 51, resets the positions that become free.

Via the window control unit 88, it is therefore advantageously ensured that only current information is contained in the combined video signal. This can take place, for example, in that the corresponding positions are set to a background value and/or in that an alpha value of the previously placed video signal is set to zero. This is possible since the frame buffer 51 is configured as a multilayer frame buffer 51. If the alpha value of an image layer is set to zero, the layers therebelow become visible and/or are displayed.

Figure 5:
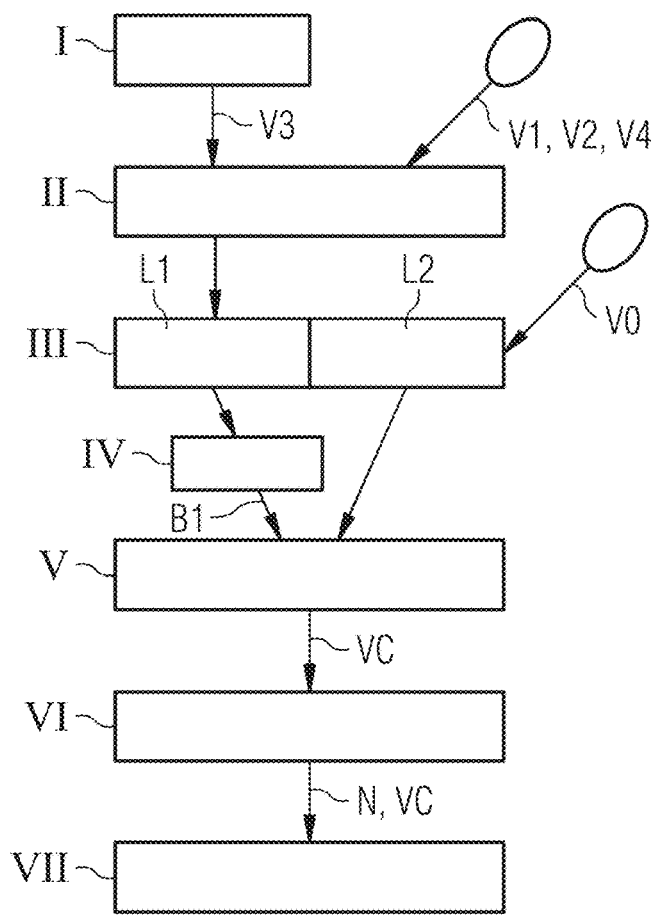
FIG. 5 shows a schematic flow diagram of an exemplary embodiment of a method according to the invention for processing video data.

FIG. 5 shows a schematic flow diagram of an exemplary embodiment of a method according to the invention for image processing.

In a preparatory first step I, video data V3 is generated by a computer unit 25 via software 27, said video data comprising UI data M0, M1, M2 in two image regions B2. In first image regions B1 different from the second image regions B2, the video data V3 is filled and/or masked via the software 27 with a defined color value.

In a second step II, the software-generated video data V3 and video data V1, V2, V4 from other video sources is received via the video interface 83.

In a third step, the software-generated video data V3 is written via the frame buffer control system 87 via the frame buffer interface 86 into the first layer L1 of the frame buffer 51. In addition, the further video data V1, V2, V4 is written via the frame buffer interface 86 at positions assigned to it via the configuration of the frame buffer control system 87 into the second layer L2 of the frame buffer 51. Furthermore, the second layer L2 of the frame buffer 51 is written with a default color value and/or a default graphic as video data V0, provided it is not already filled with the video data V1, V2, V4.

In a fourth step IV, it is established in the first L1 of the frame buffer 51 at which positions and/or image points the defined color value occurs. In particular, it is established therein whether the defined color value occurs at a plurality, that is at least two, sequential image points in a row. These image points form the first image regions B1.

In a fifth step V, the video data V1, V2, V4, V0 of the second layer L2 is used for the generation of the combined frame VC in the first image regions B1. In the other image points, specifically the second image region B2, the video data V3 of the first layer L1 is used. The combined frame VC of video data V1, V2, V3, V4, V0 assembled in this way is read out from the frame buffer 51 via the frame buffer interface 86.

In an additional sixth step VI, the combined frame VC is packed via a network interface 63 of the network device 50 in network data N and is sent via the network 20.

In an additional seventh step VII, the network data N is received by a further network device 50. The combined frame VC is unpacked and is displayed via a suitable output device 23.

The combined frame VC can alternatively be displayed directly via a suitable output device 23.

Finally, it should again be noted that the apparatuses and methods described above in detail are merely exemplary embodiments which can be modified by a person skilled in the art in a wide variety of ways without departing from the scope of the invention. For example, the frame buffer can be expanded with further layers using the functional methods described.

In addition, the frame buffer has previously been described solely as an asynchronous frame buffer. The use of a synchronous frame buffer is also possible in that each layer is realized via regions that are to be written, read out and emptied. A pointer is then placed in the frame buffer control system for each access that is to be carried out. A frame is only read out when it has been completely written in the frame buffer. A synchronous frame buffer could be advantageous in order to prevent clashing read and/or write access events or thereby also to prevent imaging artifacts. This is because it is always a whole and consistent frame that is read out.

Furthermore, the use of the indefinite article "a" or "an" does not preclude the possibility that the relevant features can also be present plurally. Similarly, the expression "unit" does not preclude this consisting of a plurality of components which—if not otherwise described—can possibly also be spatially distributed. The network devices, however, are explicitly integral units which comprise all the specified components in one constructed unit.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. An integrated circuit arrangement comprising:
a number of video interfaces configured to at least one of receive or emit video data from a plurality of data streams; and
a frame buffer control system and a frame buffer interface, the frame buffer control system configured to control access events to a frame buffer via the frame buffer interface in such that
the video data from the plurality of data streams is written into different layers among a plurality of layers of the frame buffer, first video data of a first layer having a defined color value in first image regions, the first video data being among the video data from the plurality of data streams, the first layer being among the plurality of layers, and the first image regions being variable frame-by-frame,
the first image regions are established as a line-by-line plurality of consecutive pixels having the defined color value, and
a combined frame of video data is read out from the frame buffer, wherein
in the first image regions, the combined frame is formed from second video data of a second layer among the plurality of layers, the second video data being among the video data from the plurality of data streams, and
in second image regions, the combined frame is formed using the first video data of the first layer.

2. The integrated circuit arrangement of claim 1, wherein the first video data comprises software-generated data in second image regions.

3. The integrated circuit arrangement of claim 2, wherein the defined color value is a color value complementary to user interface data.

4. The integrated circuit arrangement of claim 3, wherein the video interfaces comprise network interfaces configured to receive the video data from separate network devices.

5. The integrated circuit arrangement of claim 3, wherein the frame buffer has more than two layers including a higher-order layer and a lower-order layer; and
the combined frame is formed from the second video data of the lower-order layer in the first image regions of the higher-order layer.

6. The integrated circuit arrangement of claim 2, wherein the second layer includes a plurality of lower-order layers; the second video data includes a plurality of video frames included in the plurality of lower-order layers; and
the second video data is formed as a linear combination the plurality of video frames.

7. The integrated circuit arrangement of claim 6, further comprising:
a window control unit configured to reset positions of the plurality of data streams in the frame buffer based on a displacement of the position of one among the plurality of data streams in the frame buffer.

8. The integrated circuit arrangement of claim 2, wherein the frame buffer has more than two layers including a higher-order layer and a lower-order layer; and
the combined frame is formed from the second video data of the lower-order layer in the first image regions of the higher-order layer.

9. The integrated circuit arrangement of claim 8, wherein the video interfaces comprise network interfaces configured to receive the video data from separate network devices.

10. The integrated circuit arrangement of claim 1, wherein the line-by-line plurality of consecutive pixels form rows of the first image regions.

11. The integrated circuit arrangement of claim 1, wherein the frame buffer has more than two layers including a higher-order layer and a lower-order layer; and
the combined frame is formed from the second video data of the lower-order layer in the first image regions of the higher-order layer.

12. The integrated circuit arrangement of claim 1, wherein the video interfaces comprise network interfaces configured to receive the video data from separate network devices.

13. The integrated circuit arrangement of claim 1, further comprising:
a window control unit configured to reset positions of the plurality of data streams in the frame buffer based on a displacement of the position of one among the plurality of data streams in the frame buffer.

14. A network device comprising:
the integrated circuit arrangement of claim 1; and
physical interfaces connected to corresponding interfaces of the integrated circuit arrangement and to the frame buffer.

15. A computer unit configured to generate the first layer of the first video data for transferring to the integrated circuit arrangement of claim 1, wherein the first video data includes software-generated data in the second image regions.

16. The computer unit of claim 15, wherein the software-generated data is user interface (UI) data, the UI data comprising video data of a mouse pointer.

17. A network comprising at least one network device, the at least one network device including the network device of claim 14.

18. A method for processing video data via an integrated circuit, the method comprising:
writing video data from a plurality of data streams into different layers among a plurality of layers of a frame buffer, first video data of a first layer having a defined color value in first image regions, the first video data being among the video data from the plurality of data streams, the first layer being among the plurality of layers, and the first image regions being variable frame-by-frame;
establishing the first image regions as a line-by-line plurality of consecutive pixels having the defined color value; and
reading out a combined frame of video data from the frame buffer, wherein
in the first image regions, the combined frame is formed from second video data of a second layer among the plurality of layers, the second video data being among the video data from the plurality of data streams, and
in second image regions, the combined frame is formed using the first video data of the first layer.

19. A non-transitory computer program product having a computer program which can be directly loaded into an integrated circuit arrangement, the computer program having program portions that cause the integrated circuit arrangement to perform the method of claim 18 when the integrated circuit arrangement is configured via the computer program.

20. A non-transitory computer-readable medium having program portions that, when executed by an integrated circuit arrangement, cause the integrated circuit arrangement to perform the method of claim 18.

* * * * *